US011829799B2

(12) United States Patent
Sathe et al.

(10) Patent No.: US 11,829,799 B2
(45) Date of Patent: Nov. 28, 2023

(54) DISTRIBUTED RESOURCE-AWARE TRAINING OF MACHINE LEARNING PIPELINES

(71) Applicant: INTERNATIONAL BUSINESS MACHINES CORPORATION, Armonk, NY (US)

(72) Inventors: Saket Sathe, Mohegan Lake, NY (US); Gregory Bramble, Larchmont, NY (US); Long Vu, Chappaqua, NY (US); Theodoros Salonidis, Wayne, PA (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 17/068,890

(22) Filed: Oct. 13, 2020

(65) Prior Publication Data

US 2022/0114019 A1 Apr. 14, 2022

(51) Int. Cl.
*G06F 9/50* (2006.01)
*G06N 20/00* (2019.01)
*G06F 18/214* (2023.01)

(52) U.S. Cl.
CPC ............ *G06F 9/505* (2013.01); *G06F 9/5044* (2013.01); *G06F 9/5077* (2013.01);
(Continued)

(58) Field of Classification Search
None
See application file for complete search history.

(56) References Cited

U.S. PATENT DOCUMENTS

| 11,244,242 B2* | 2/2022 | Prakash ................... G06N 3/08 |
| 2014/0215471 A1* | 7/2014 | Cherkasova .......... G06F 9/5066 |
| | | 718/102 |

(Continued)

FOREIGN PATENT DOCUMENTS

| CN | 109559734 A | 4/2019 |
| CN | 10888744 A | 3/2020 |

(Continued)

OTHER PUBLICATIONS

Bao, et al., "Online Job Scheduling in Distributed Machine Learning Clusters," arXiv.org, arXiv:1801.00936v1, Jan. 3, 2018, pp. 1-14.

(Continued)

*Primary Examiner* — Eric C Wai
(74) *Attorney, Agent, or Firm* — Kristofer Haggerty

(57) ABSTRACT

A method, a structure, and a computer system for predicting pipeline training requirements. The exemplary embodiments may include receiving one or more worker node features from one or more worker nodes, extracting one or more pipeline features from one or more pipelines to be trained, and extracting one or more dataset features from one or more datasets used to train the one or more pipelines. The exemplary embodiments may further include predicting an amount of one or more resources required for each of the one or more worker nodes to train the one or more pipelines using the one or more datasets based on one or more models that correlate the one or more worker node features, one or more pipeline features, and one or more dataset features with the one or more resources. Lastly, the exemplary embodiments may include identifying a worker node requiring a least amount of the one or more resources of the one or more worker nodes for training the one or more pipelines.

20 Claims, 6 Drawing Sheets

(52) U.S. Cl.
CPC .......... *G06F 9/5094* (2013.01); *G06F 18/214* (2023.01); *G06N 20/00* (2019.01)

(56) References Cited

U.S. PATENT DOCUMENTS

| | | | |
|---|---|---|---|
| 2017/0068888 | A1 | 3/2017 | Chung |
| 2018/0314936 | A1 | 11/2018 | Barik |
| 2019/0138934 | A1 | 5/2019 | Prakash |
| 2019/0197404 | A1 | 6/2019 | Wang |
| 2019/0311230 | A1* | 10/2019 | Mahapatra ........... G06V 10/454 |
| 2021/0089961 | A1* | 3/2021 | Zeise .................... G06N 20/00 |

FOREIGN PATENT DOCUMENTS

| | | |
|---|---|---|
| CN | 116368504 A | 6/2023 |
| GB | 2614475 A | 7/2023 |
| WO | 2022079517 A1 | 4/2022 |

OTHER PUBLICATIONS

Berral, et al., "Adaptive Scheduling on Power-Aware Managed Data Centers Using Machine Learning," 2011 IEEE/ACM 12th International Conference on Grid Computing, Lyon, 2011, doi: 10.1109/Grid.2011.18, downloaded Sep. 10, 2020, 8 pages.

Berral, et al., "Towards Energy-Aware Scheduling in Data Centers Using Machine Learning," e-Energy '10: Proceedings of the 1st International Conference on Energy-Efficient Computing and Networking, Apr. 2010, pp. 215-224.

Burns, et al., "Borg, Omega, and Kubernetes," System Evolution, ACMQUEUE, Jan.-Feb. 2016, pp. 70-93.

Dean, et al., "Large Scale Distributed Deep Networks," NIPS'12: Proceedings of the 25th International Conference on Neural Information Processing Systems, vol. 1, Dec. 2012, pp. 1223-1231.

Disclosed Anonymously, "System for Balancing Resource Usage for Computation of Analytics Models in Cloud," IP.com, IPCOM000257317D, Jan. 31, 2019, pp. 1-5.

Mell et al., "The NIST Definition of Cloud Computing", National Institute of Standards and Technology, Special Publication 800-145, Sep. 2011, pp. 1-7.

Peng, et al., "DL2: A Deep Learning-Driven Scheduler for Deep Learning Clusters," arXiv preprint, arXiv: 1909.06040v1, Sep. 13, 2019, pp. 1-15.

Salama, et al., "XAI: A Middleware for Scalable AI" Proceedings of the 8th International Conference on Data Science, Technology and Applications (DATA 2019), , SCITEPRESS, pp. 109-120.

Sutton, et al., Reinforcement Learning, An Introduction, Second Edition, ISBN: 9780262039246, Nov. 2018, pp. 1-552.

Xu, et al., "Efficient Online Resource Allocation in Heterogeneous Clusters with Machine Variability," IEEE INFOCOM 2019—IEEE Conference on Computer Communications, IEEE, 2019, pp. 478-486.

Zheng, et al., "Cynthia: Cost-Efficient Cloud Resource Provisioning for Predictable Distributed Deep Neural Network Training," 48th International Conference on Parallel Processing (ICPP 2019), Aug. 5-8, 2019, Kyoto, Japan, ACM ISBN 978-1-4503-6295-5/19/08, 11 pages.

International Searching Authority, "International Search Report and Written Opinion of the International Searching Authority", International Application No. PCT/IB2021/058455, dated Dec. 24, 2021, 9 pages.

Australian Examination Report, Australian Application No. 2021359236, dated Aug. 2, 2023, 3 pages.

\* cited by examiner

DISTRIBUTED RESOURCE-AWARE TRAINING OF MACHINE LEARNING PIPELINES

BACKGROUND

The exemplary embodiments relate generally to machine learning pipelines, and more particularly to distributed, resource-aware training of automated machine learning pipelines.

Automated machine learning often involves training several pipelines. These pipelines are generated by pipeline optimization frameworks that explore and arrange various transformers and estimators to find optimal pipelines. Training these pipelines in a distributed environment is a challenging problem because it's impossible to know apriori how much time and resources it will take for training a pipeline. Therefore, pipelines cannot currently be intelligently allocated to worker nodes.

SUMMARY

The exemplary embodiments disclose a method, a structure, and a computer system for pipeline training. The exemplary embodiments may include receiving one or more worker node features from one or more worker nodes, extracting one or more pipeline features from one or more pipelines to be trained, and extracting one or more dataset features from one or more datasets used to train the one or more pipelines. The exemplary embodiments may further include predicting an amount of one or more resources required for each of the one or more worker nodes to train the one or more pipelines using the one or more datasets based on one or more models that correlate the one or more worker node features, one or more pipeline features, and one or more dataset features with the one or more resources. Lastly, the exemplary embodiments may include identifying a worker node requiring a least amount of the one or more resources of the one or more worker nodes for training the one or more pipelines.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
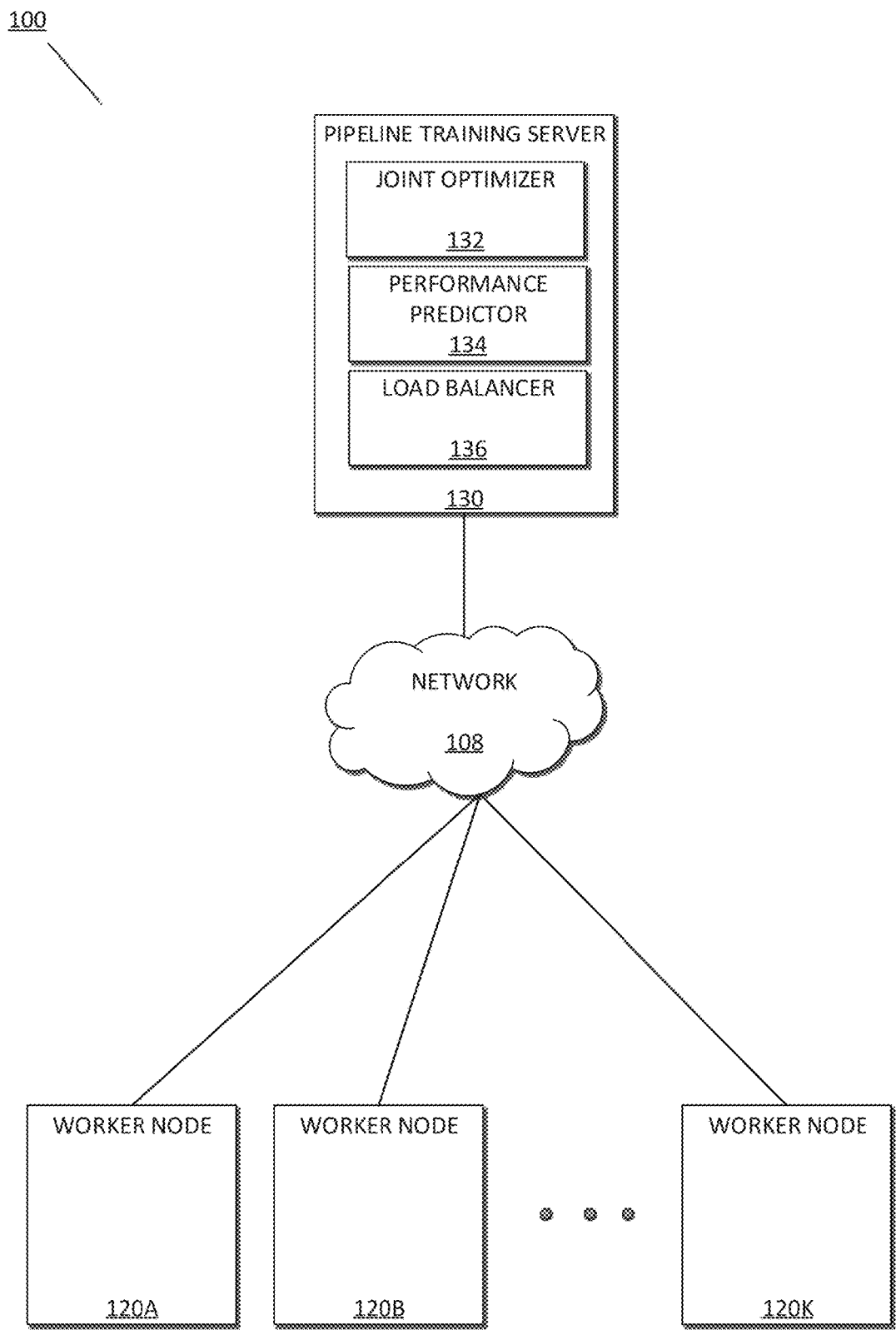
FIG. 1 depicts an exemplary schematic diagram of a pipeline training system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Automated machine learning often involves training several pipelines. These pipelines are generated by pipeline optimization frameworks that explore and arrange various transformers and estimators to find optimal pipelines. Training these pipelines in a distributed environment is a challenging problem because it's impossible to know apriori how much time and resources it will take for training a pipeline. Therefore, pipelines cannot currently be intelligently allocated to worker nodes.

A machine learning pipeline is a series of operations (such as data preprocessing, outlier detection, feature engineering, etc.) followed by an estimator. Such pipelines may be managed by an algorithm known as a joint optimizer that is responsible for 1) assembling various pipelines together; 2) training each one of the assembled pipelines using cross-validation; 3) analyzing the results; and 4) deciding which pipelines to execute next. The joint optimizer may continue the process until it finds the best pipeline. Of the tasks performed by a joint optimizer, training each of the assembled pipelines using cross-validation is the most computationally taxing step, as well as the focus of the invention claimed herein which discloses a novel method of resource-aware training of machine learning pipelines.

Methods exist for training pipelines, however each technique has respective drawbacks. For example, in the current AutoAI® system (AutoAI is a registered trademark of IBM Corp.), all the assembled pipelines are executed on a single worker node. In another example, knapsack/bin-packing techniques use the length of the pipeline to quantify the pipeline. Alternatively, greedy bin-packing approximation algorithms, e.g., first-fit binpacking, pack items of different volumes into a finite number of bins or containers each of a fixed given volume in a way that minimizes the number of bins used. There is additionally the round robin technique where pipelines are distributed in a particular, repeating order.

There are, however, several problems with the preceding approaches. First, they do not estimate how much time a particular pipeline training will take as various machine learning algorithms have different complexity. Second, technique such as round robin do not take into consideration how busy the machines are and whether they are capable of handling the training of the particular pipeline.

The invention claimed herein cures the deficiencies of the preceding approaches by using a data-driven approach that looks at past performance and builds a predictive model of pipeline training. More specifically, the claimed invention can predict the resource requirements of training a pipeline and continuously learns to improve the predictions using data of previous pipeline executions.

FIG. 1 depicts the pipeline training system 100, in accordance with exemplary embodiments. According to the exemplary embodiments, the pipeline training system 100 may include one or more worker nodes 120A-K and a pipeline training server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies including 2.4 GHz and 5 GHz internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, the one or more worker nodes 120A-K may each be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. Each of the one or more worker nodes 120A-K may be configured to train one or more machine learning pipelines. In the example embodiment, it is assumed that each of the one or more worker nodes 120A-K have access to a same dataset and each pipeline can be trained on a single worker node 120 of the one or more worker nodes 120A-K. The one or more worker nodes 120A-K are described in greater detail as a hardware implementation with reference to FIG. 4, as part of a cloud implementation with reference to FIG. 5, and/or as utilizing functional abstraction layers for processing with reference to FIG. 6.

In exemplary embodiments, the pipeline training server 130 includes a joint optimizer 132, a performance predictor 134, and a load balancer 136. The pipeline training server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. While the pipeline training server 130 is shown as a single device, in other embodiments, the pipeline training server 130 may be comprised of a cluster or plurality of computing devices, in a modular manner, etc., working together or working independently. The pipeline training server 130 is described in greater detail as a hardware implementation with reference to FIG. 4, as part of a cloud implementation with reference to FIG. 5, and/or as utilizing functional abstraction layers for processing with reference to FIG. 6.

In embodiments, the joint optimizer 132 may be a software and/or hardware program capable of assembling various pipelines together, training each of the assembled pipelines using cross-validation, analysing the results, and deciding which pipelines to execute next. In particular, and with respect to training each one of the assembled pipelines using cross-validation, the joint optimizer 132 may be further capable of receiving one or more worker node heartbeat features and extracting one or more pipeline features and one or more dataset features. The joint optimizer 132 may be further capable of predicting required pipeline training resources by generating one or more models and selecting one or more worker nodes based thereon. Lastly, the joint optimizer 132 may be capable of adjusting the models based on a feedback loop. The joint optimizer 132 is described in greater detail with reference to FIG. 2-6.

The performance predictor 134 may be a software and/or hardware program capable of predicting an amount of resources required to train a pipeline, e.g., required time. The performance predictor 134 is described in greater detail with reference to FIG. 2-6.

The load balancer 136 may be a software and/or hardware program capable of distributing a set of tasks over a set of resources with the aim of making their overall processing more efficient. The performance predictor 134 is described in greater detail with reference to FIG. 2-6.

Figure 2:
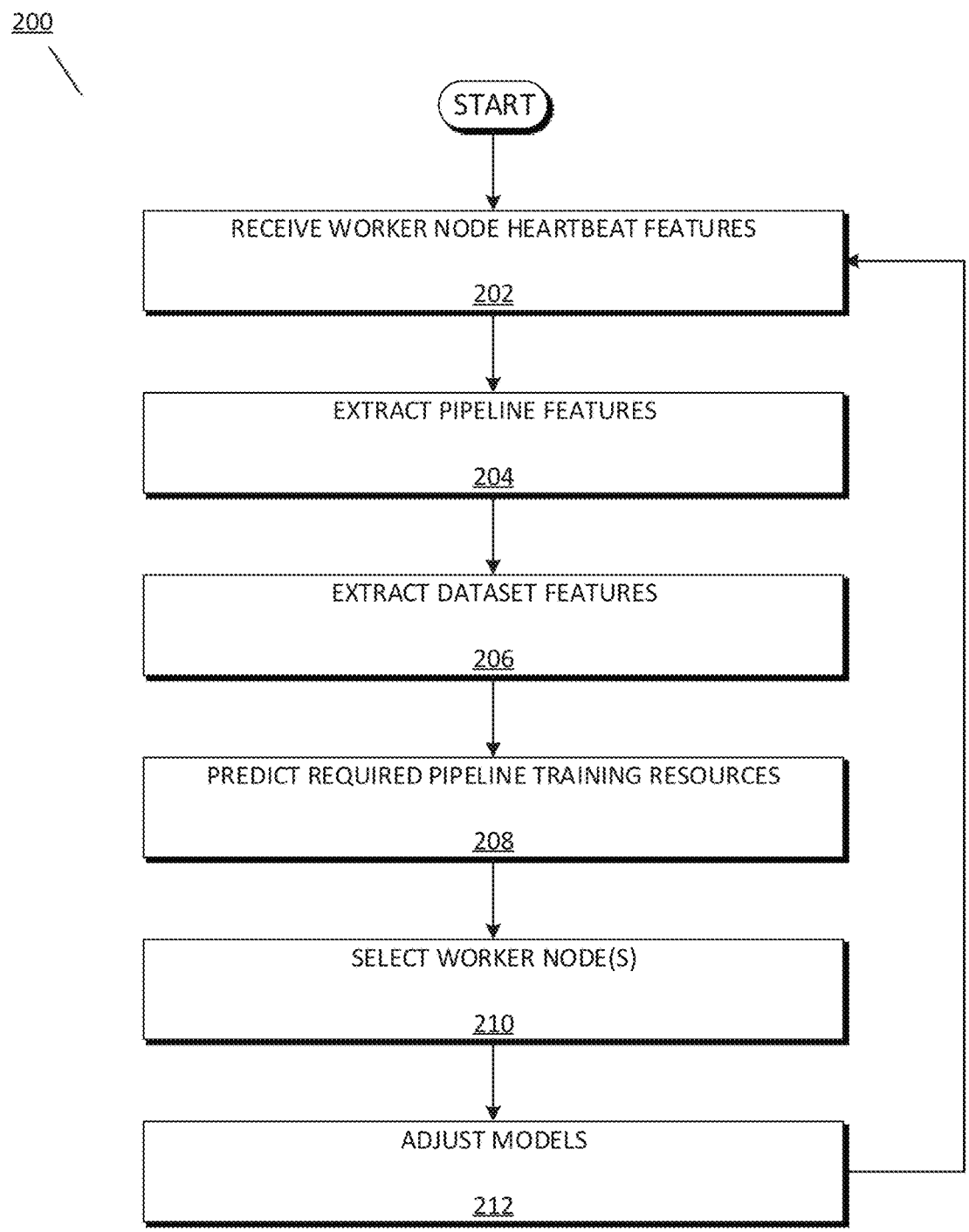
FIG. 2 depicts an exemplary flowchart 200 illustrating the operations of a joint optimizer 132 of the pipeline training system 100, in accordance with the exemplary embodiments.

FIG. 2 depicts an exemplary flowchart 200 illustrating the operations of the joint optimizer 132 of the pipeline training system 100, in accordance with the exemplary embodiments. In the following detailed description, it is assumed that each of the one or more worker nodes 120A-K have access to the dataset and can train any pipeline. While reference is only made to one dataset, it will be appreciated by one skilled in the art that the claimed invention is applicable to any number of datasets.

The performance predictor 134 may receive heartbeat features from the one or more worker nodes 120A-K (step 202). In embodiments, the heartbeat features quantify a busyness and power of each of the worker nodes 120A-K, and may comprise features extracted from worker node data such as a number of CPUs and cores therein, a number of GPUs and cores therein, CPU and GPU utilization, CPU and GPU memory and swap usage, and outputs of vmstat and iostat commands. In the example embodiment, the heartbeat features may be received by the load balancer 136 of the joint optimizer 132 at predefined intervals via the network 108. If, however, the joint optimizer 132 fails to receive heartbeat features from any of the one or more worker nodes 120A-K, the joint optimizer 132 marks the one or more unresponsive worker nodes 120A-K as unresponsive and omits training predictions therefor until heartbeat features are again received. In embodiments, the joint optimizer 132 may train a model for determining which of the worker nodes 120A-K can train the pipeline in a least amount of resources based on the heartbeat features collected herein, along with pipeline features and dataset features described below.

Figure 3:
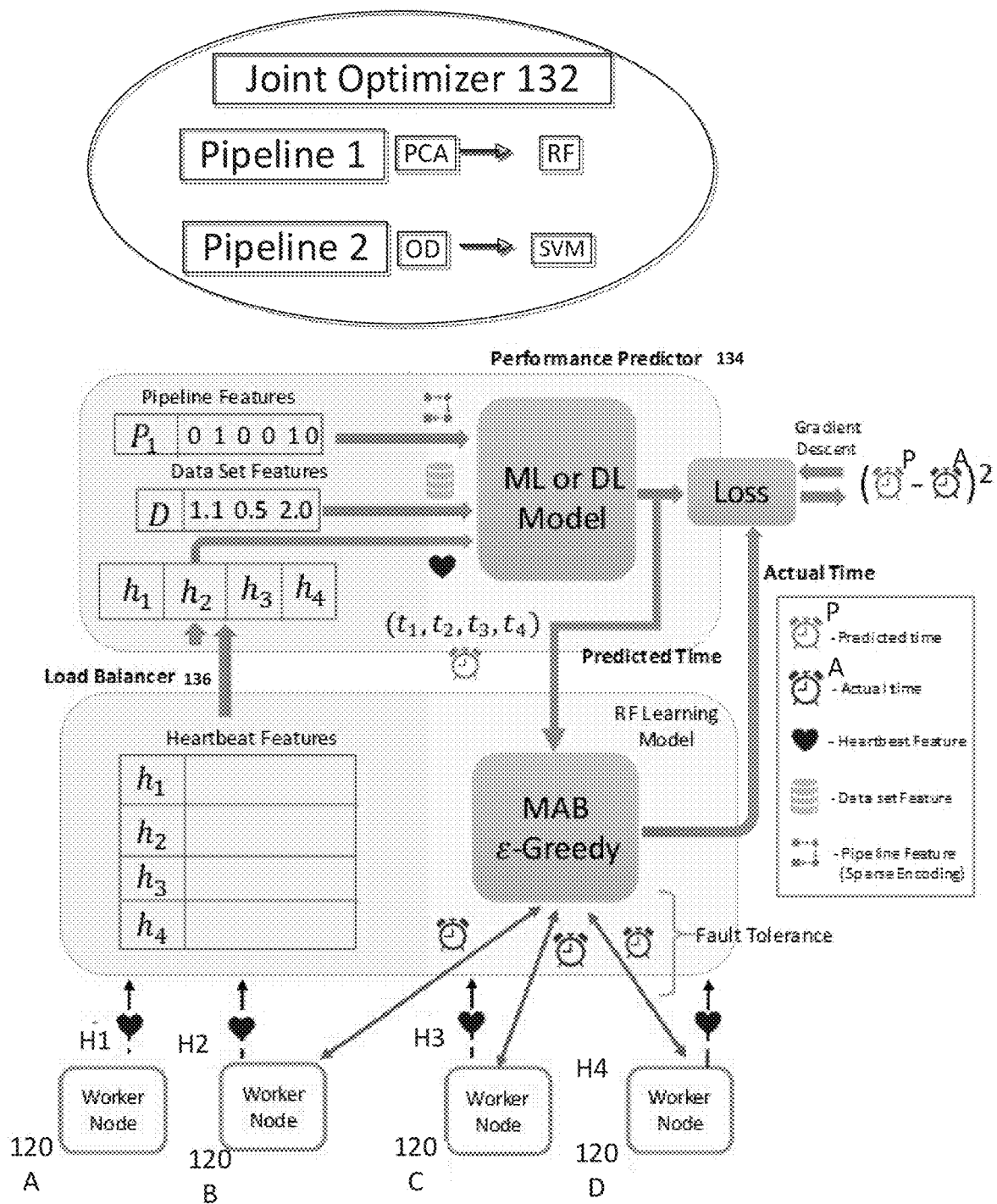
FIG. 3 depicts an example illustrating the operations of the joint optimizer 132 of the pipeline training system 100, in accordance with the exemplary embodiments.

In order to better illustrate the operations of the joint optimizer 132, reference is now made to an illustrative example depicted by FIG. 3 wherein the joint optimizer 132 is configured to train two pipelines: 1) principal component analysis (PCA) to random forest (RF); and 2) outlier detection (OD) to support vector machine (SVM), on any of four worker nodes 120A, 120B, 120C, and 120D. The joint optimizer 132 receives respective heartbeat features H1, H2, H3, and H4 that include a number of CPUs and cores therein, a number of GPUs and cores therein, CPU and GPU utilization, CPU and GPU memory and swap usage, and outputs of vmstat and iostat commands.

The joint optimizer 132 may extract pipeline features (step 204). In embodiments, the pipeline features may include type of estimator, type of pre-processor, type of feature engineering, and parameter settings thereof, and the joint optimizer 132 may extract pipeline features via the performance predictor 134 by performing a sparse encoding of the one or more pipelines that are to be trained. In particular, the joint optimizer 132 may set the entry of used transformers and estimators to 1 while unused transformers and estimators are set to 0. The joint optimizer 132 may further encode parameters of each of the individual pipeline components to create an encoded version of the pipeline. As described above, the joint optimizer 132 may utilize the pipeline features, along with the heartbeat features and dataset features, to build one or more models capable of predicting which of the worker nodes 120A-K can train a pipeline using the least amount of resources.

Returning to the illustrative example introduced above and depicted by FIG. 3, the joint optimizer 132 extracts the features of type of estimator, type of pre-processor, type of feature engineering, and parameter settings thereof from the first and second pipelines described above.

The joint optimizer 132 may extract one or more dataset features (step 206). In embodiments, the dataset features capture various high-level dimensions of the data set, and the extracted dataset features may include a number of datapoints, a number of features, a number of cross-validation folds, number of features with categorical values, number of features with real values, number of missing values, and number of sparse values. As described above, the joint optimizer 132 may utilize the dataset features, along with the heartbeat features and pipeline features, to build one or more models capable of predicting which of the worker nodes 120A-K can train a pipeline using the least amount of resources.

Continuing the previously introduced example illustrated by FIG. 3, the joint optimizer 132 may extract dataset features from the dataset that include number of data points, number of features, number of CV folds, number of features with categorical values, number of features with real values, number of missing values, and number of sparse features from the dataset.

The joint optimizer 132 may predict required pipeline training resources (step 208). In embodiments, the joint optimizer 132 may predict required performance measures for each of the one or more worker nodes 120A-K to train a respective pipeline via the performance predictor 134. Such required performance measures may include time, power consumption, peak memory usage, peak CPU utilization, etc. In embodiments, the joint optimizer 132 may predict required pipeline training resources using a machine learning or deep learning model. In such embodiments, the joint optimizer 132 may receive as inputs the pipeline features, the dataset features, and the heartbeat features, from which a model is trained using an algorithm such as Random Forest, GBM, Logistic Regression, Deep Neural Networks, and Autoencoders. The model captures how each of the aforementioned features impact an amount of resources required for each of the worker nodes 120A-K to train a pipeline. Once the model is trained, the joint optimizer 132 is capable of applying the trained model to a new set of heartbeat features, pipeline features, and dataset features in order to output the predicted performance measures for each worker node with respect to training a pipeline. The joint optimizer 132 may then tweak the models based on comparing the predicted performance measures to the actual performance measures, as will be described in greater detail forthcoming.

Furthering the previously introduced example illustrated by FIG. 3, the joint optimizer 132 predicts that the worker nodes 120A-D can train the first pipeline in A, B, C, and D minutes, respectively, and the second pipeline in W, X, Y, and Z minutes, respectively. The joint optimizer 132 may further predict peak CPU usage, etc.

The joint optimizer 132 may select worker nodes (step 210). In embodiments, the joint optimizer 132 may select at least one of the one or more worker nodes 120A-K for executing the pipeline based on the predicted pipeline training resources required. In embodiments, the joint optimizer 132 may select the one or more worker nodes 120A-K based on a ε-Greedy or Multi Arm Bandit problem approach. In an ε-Greedy, or epsilon-greedy approach, the joint optimizer 132 selects the best predicted worker node 120A-K with probability (1−ε) and a random worker node 120A-K with probability ε. For example, the joint optimizer 132 may then select a top three predicted workers (1−ε), where ε is set between 0.05 and 0.1, and select three random workers with probability E. In most cases, the joint optimizer 132 will select the best predicted worker node 120A-K, however there is a small chance that the joint optimizer 132 selects the random worker node 120A-K. In a Multi-Armed Bandit approach, the joint optimizer 132 may train the model by first selecting three random workers and executing a pipeline for n iterations, e.g., n=1000. Once the joint optimizer 132 has made enough evaluations to identify a best performing worker node 120A-K, the joint optimizer 132 may then send all pipelines to the best performing worker node 120A-K. If the joint optimizer 132 determines that the performance of the best performing working node 120A-K degrades as a result, the joint optimizer 132 may then revert back to randomly identifying a best performing worker node 120A-K and repeating the process.

With reference to the previously introduced example, the joint optimizer 132 selects the worker node 120A to train the first pipeline and worker node 120B to train the second pipeline.

The joint optimizer 132 may adjust models based on a feedback loop (step 212). In embodiments, the joint optimizer 132 may adjust models by determining a loss following the training of one or more pipelines by the one or more worker nodes 120A-K. In particular, the joint optimizer 132 may receive the predicted required pipeline training resources and the actual pipeline training resources consumed, then output loss based on EQ. 1:

$$\text{Loss} = (\text{Predicted Resources} - \text{Actual Resources})^2 \qquad \text{EQ. 1}$$

The joint optimizer 132 may then back propagate the loss using a gradient descent.

Concluding the aforementioned example depicted by FIG. 3, the joint optimizer 132 adjusts models based on identifying a loss when the worker node 120A trained the first pipeline and worker node 120B trained the second pipeline.

Key features of the claimed invention include improved performance over time through backpropagation of loss, generation of a variety of training data using a Multi Arm Bandit approach, and the use of an Random Forest system that continuously predicts, gathers training data, learns, and predicts better.

It will be appreciated by one skilled in the art that the aforementioned invention can be implemented within the fields of, for example, automated machine learning and artificial intelligence, distributed pipeline training, fast and continuous data science pipeline joint optimizing, and load balancing of machine learning training pipelines. The claimed system may be implemented in, for example, a Kubernetes and Docker platform wherein the one or more worker nodes 120A-K are Docker containers and heartbeat features can be obtained using kubectl. In addition, the machine learning/deep learning model and ε-Greedy models can be run on a primary or as a microservice in the cluster. Moreover, the system can be scaled using AutoScaler or manually creating pods using the output of the ML/DL model, and the containers can write output of each pipeline training to shared cloud or network storage such that the models can pick up data from storage and gradient descent their losses.

FIG. 3 depicts an example illustrating the operations of the joint optimizer 132 of the pipeline training system 100, in accordance with the exemplary embodiments.

Figure 4:
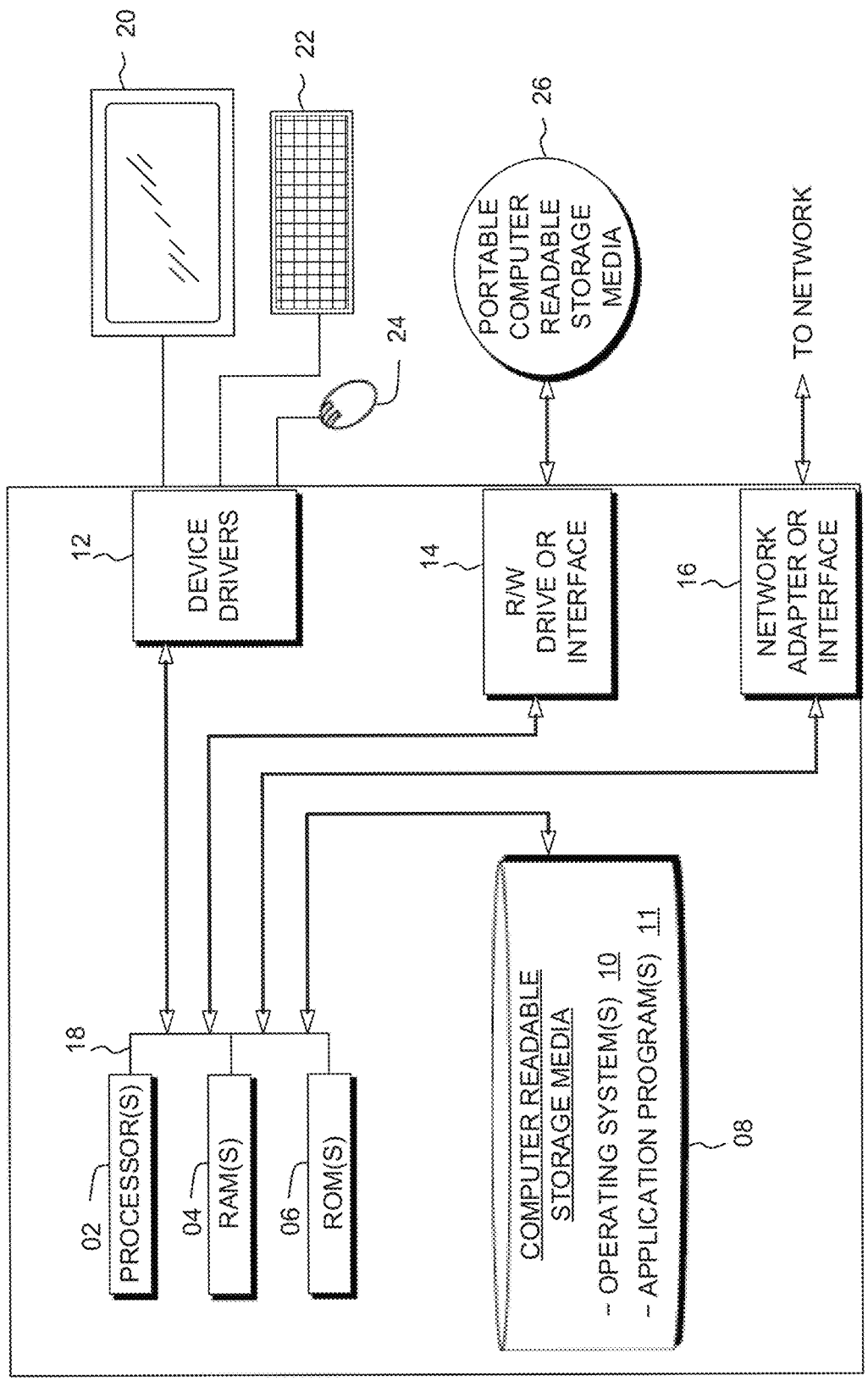
FIG. 4 depicts an exemplary block diagram depicting the hardware components of the pipeline training system 100 of FIG. 1, in accordance with the exemplary embodiments.

FIG. 4 depicts a block diagram of devices used within the pipeline training system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
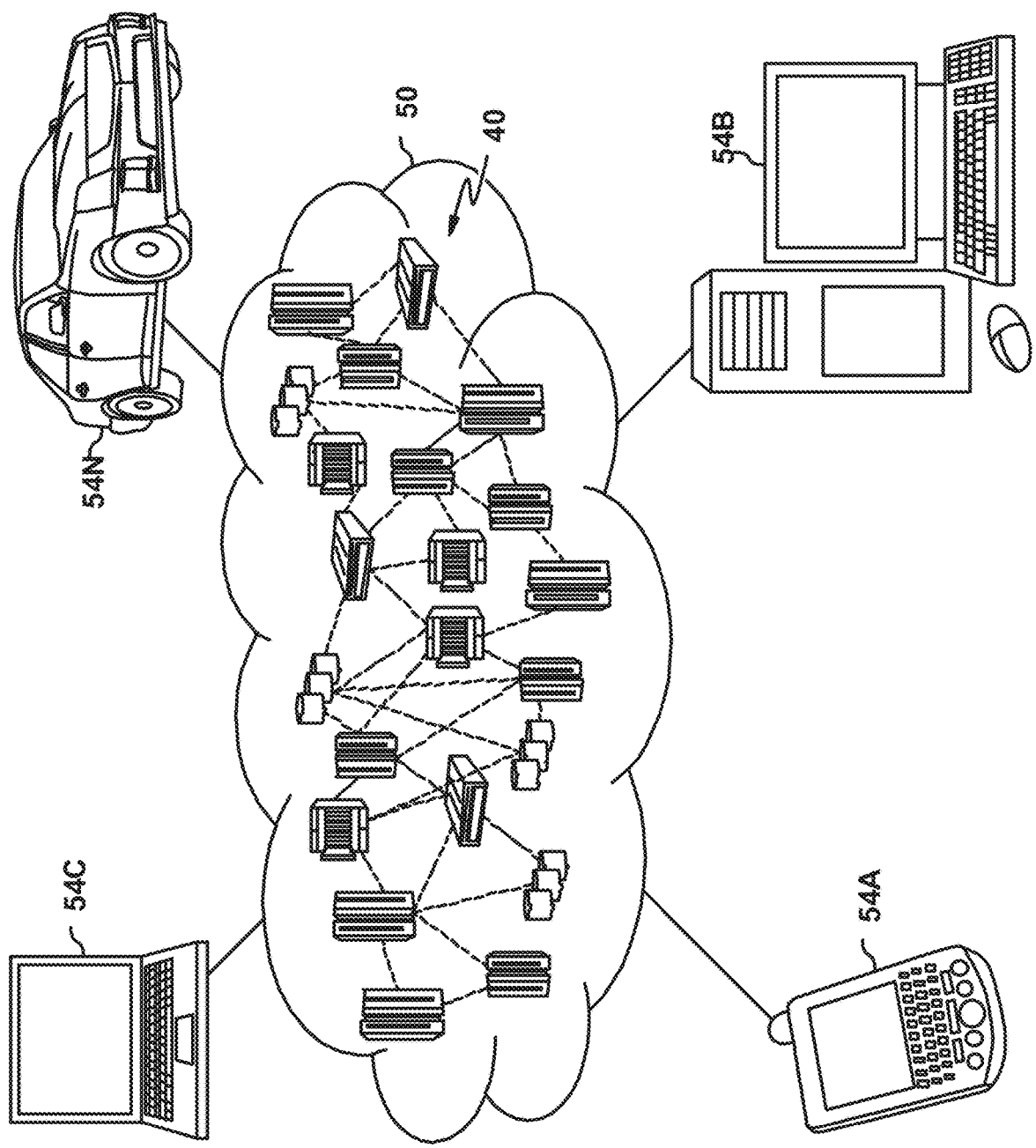
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
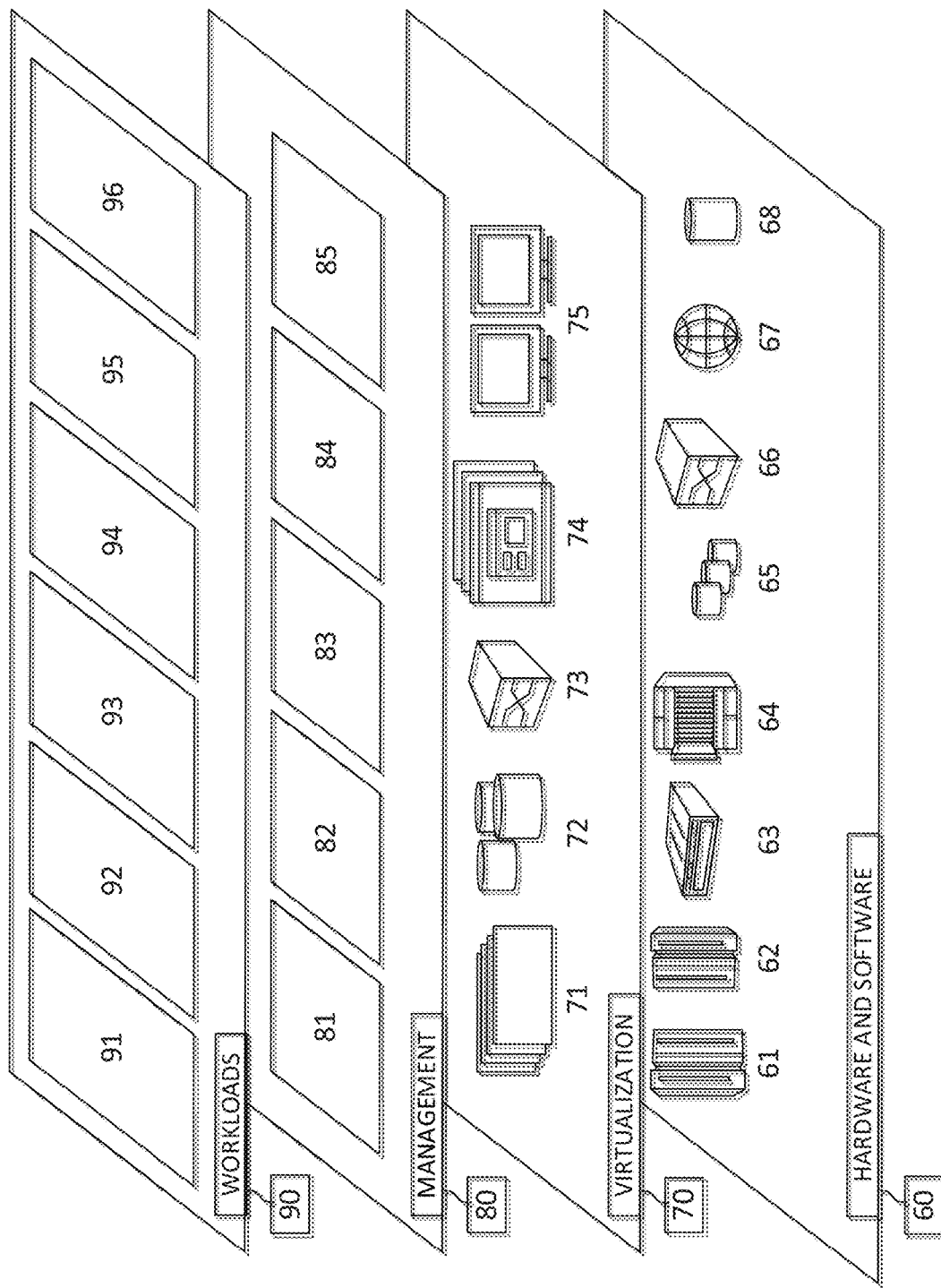
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pipeline training processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for predicting pipeline training requirements, the method comprising:
    receiving one or more worker node features from one or more worker nodes;
    extracting one or more pipeline features from one or more pipelines to be trained;
    extracting one or more dataset features from one or more datasets used to train the one or more pipelines;
    predicting an amount of one or more resources required for each of the one or more worker nodes to train the one or more pipelines using the one or more datasets based on one or more models that correlate the one or more worker node features, one or more pipeline features, and one or more dataset features with the one or more resources, the amount of the one or more resources including a peak memory utilization;
    identifying a worker node requiring a least amount of the one or more resources of the one or more worker nodes for training at least one pipeline of the one or more pipelines; and
    training the at least one pipeline using the worker node.

2. The method of claim 1, further comprising:
    determining an actual amount of resources required by the worker node to train the one or more pipelines; and
    adjusting the one or more models based on comparing the predicted amount of resources to the actual amount of resources.

3. The method of claim 1, wherein the one or more worker node features respectively include a number of CPUs and cores therein, a number of GPUs and cores therein, CPU utilization, GPU utilization, CPU memory, GPU memory, CPU and GPU swap usage, and outputs of vmstat and iostat commands.

4. The method of claim 1, wherein the one or more pipeline features include a type of estimator, a type of pre-processor, a type of feature engineering, and parameter settings thereof.

5. The method of claim 1, wherein the one or more dataset features include a number of datapoints, a number of features, a number of cross-validation folds, a number of features with categorical values, a number of features with real values, a number of missing values, and a number of sparse values.

6. The method of claim 1, wherein the one or more models are trained via Random Forest, GBM, Logistic Regression, Deep Neural Networks, and Autoencoders.

7. The method of claim 1, wherein the one or more resources include a training time, a power consumption, and a peak CPU utilization.

8. A computer program product for predicting pipeline training requirements, the computer program product comprising:
    one or more non-transitory computer-readable storage media and program instructions stored on the one or more non-transitory computer-readable storage media capable of performing a method, the method comprising:
        receiving one or more worker node features from one or more worker nodes;
        extracting one or more pipeline features from one or more pipelines to be trained;
        extracting one or more dataset features from one or more datasets used to train the one or more pipelines;
        predicting an amount of one or more resources required for each of the one or more worker nodes to train the one or more pipelines using the one or more datasets based on one or more models that correlate the one or more worker node features, one or more pipeline features, and one or more dataset features with the one or more resources, the amount of the one or more resources including a peak memory utilization;
        identifying a worker node requiring a least amount of the one or more resources of the one or more worker nodes for training at least one pipeline of the one or more pipelines; and
        training the at least one pipeline using the worker node.

9. The computer program product of claim 8, further comprising:
    determining an actual amount of resources required by the worker node to train the one or more pipelines; and
    adjusting the one or more models based on comparing the predicted amount of resources to the actual amount of resources.

10. The computer program product of claim 8, wherein the one or more worker node features respectively include a number of CPUs and cores therein, a number of GPUs and cores therein, CPU utilization, GPU utilization, CPU memory, GPU memory, CPU and GPU swap usage, and outputs of vmstat and iostat commands.

11. The computer program product of claim 8, wherein the one or more pipeline features include a type of estimator, a type of pre-processor, a type of feature engineering, and parameter settings thereof.

12. The computer program product of claim 8, wherein the one or more dataset features include a number of datapoints, a number of features, a number of cross-validation folds, a number of features with categorical values, a number of features with real values, a number of missing values, and a number of sparse values.

13. The computer program product of claim 8, wherein the one or more models are trained via Random Forest, GBM, Logistic Regression, Deep Neural Networks, and Autoencoders.

14. The computer program product of claim 8, wherein the one or more resources include a training time, a power consumption, and a peak CPU utilization.

15. A computer system for predicting pipeline training requirements, the system comprising:

one or more computer processors, one or more computer-readable storage media, and program instructions stored on the one or more of the computer-readable storage media for execution by at least one of the one or more processors capable of performing a method, the method comprising:

receiving one or more worker node features from one or more worker nodes;

extracting one or more pipeline features from one or more pipelines to be trained;

extracting one or more pipeline features from one or more pipelines to be trained;

predicting an amount of one or more resources required for each of the one or more worker nodes to train the one or more pipelines using the one or more datasets based on one or more models that correlate the one or more worker node features, one or more pipeline features, and one or more dataset features with the one or more resources, the amount of the one or more resources including a peak memory utilization;

identifying a worker node requiring a least amount of the one or more resources of the one or more worker nodes for training at least one pipeline of the one or more pipelines; and training the at least one pipeline using the worker node.

16. The computer system of claim 15, further comprising:
determining an actual amount of resources required by the worker node to train the one or more pipelines; and
adjusting the one or more models based on comparing the predicted amount of resources to the actual amount of resources.

17. The computer system of claim 15, wherein the one or more worker node features respectively include a number of CPUs and cores therein, a number of GPUs and cores therein, CPU utilization, GPU utilization, CPU memory, GPU memory, CPU and GPU swap usage, and outputs of vmstat and iostat commands.

18. The computer system of claim 15, wherein the one or more pipeline features include a type of estimator, a type of pre-processor, a type of feature engineering, and parameter settings thereof.

19. The computer system of claim 15, wherein the one or more dataset features include a number of datapoints, a number of features, a number of cross-validation folds, a number of features with categorical values, a number of features with real values, a number of missing values, and a number of sparse values.

20. The computer system of claim 15, wherein the one or more models are trained via Random Forest, GBM, Logistic Regression, Deep Neural Networks, and Autoencoders.

* * * * *